United States Patent [19]

Miller

[11] Patent Number: 5,065,424
[45] Date of Patent: Nov. 12, 1991

[54] APPARATUS FOR SERVICING TELEPHONES FROM A REMOTE LOCATION

[76] Inventor: Arthur O. Miller, P.O. Box 21407, Little Rock, Ark. 72221

[21] Appl. No.: 326,736

[22] Filed: Mar. 21, 1989

Related U.S. Application Data

[63] Continuation-in-part of Ser. No. 66,564, Jun. 26, 1987, abandoned.

[51] Int. Cl.$^5$ ............................................. H04M 1/64
[52] U.S. Cl. ...................................... 379/70; 379/74; 379/77; 379/381
[58] Field of Search ....................... 379/70, 74, 77, 67, 379/68, 8, 29, 95, 195–199, 381, 82

[56] References Cited

U.S. PATENT DOCUMENTS

| | | | |
|---|---|---|---|
| 3,786,196 | 1/1974 | Gresham | 379/198 |
| 3,996,425 | 12/1976 | Low et al. | 379/198 |
| 4,121,053 | 10/1978 | Dick | 379/195 |
| 4,536,617 | 9/1985 | Perry | 379/29 |
| 4,550,225 | 10/1985 | Lynch et al. | 379/29 |
| 4,558,182 | 12/1985 | Perry et al. | 379/29 |
| 4,560,842 | 12/1985 | Homer | 379/29 |
| 4,653,084 | 3/1987 | Ahuja | 379/29 |
| 4,686,696 | 8/1987 | Lynch | 379/29 |
| 4,686,696 | 8/1987 | Lynch | 379/29 |

Primary Examiner—Stuart S. Levy
Assistant Examiner—Christopher R. Glembocki
Attorney, Agent, or Firm—Harold E. Meier

[57] ABSTRACT

A remote control telephone service apparatus, for connection into a telephone line between a customer's telephone and a telephone switching central office main distribution frame. One or two selected code numbers are manually input into the apparatus. Later, if these correct code numbers are dialed into the apparatus, an output signal is provided to control changes in interconnect circuitry and to provide pre-recorded voice messages relative to the condition and status of the circuit. If the dialed number does not match the code number, the apparatus will not operate, but will emit a warning message or an alarm. The apparatus may also be used to disconnect a telephone from the main distribution line as long as the receiver is left in an "off-hook" condition. The apparatus will provide pre-recorded information to the customer concerning the status of his service. When the receiver is replaced, the apparatus automatically restores the telephone to full service.

15 Claims, 3 Drawing Sheets

APPARATUS FOR SERVICING TELEPHONES FROM A REMOTE LOCATION

CROSS-REFERENCE TO PREVIOUS APPLICATION

This application is a continuation-in-part of copending application for U.S. Ser. No. 066,564 filed June 26, 1987, now abandoned.

BACKGROUND OF THE INVENTION

1. Field of the Invention

This invention relates to telecommunications equipment. In particular, the invention relates to a telecommunications apparatus, which is connected into a telephone line between a telephone and the telephone switching office at the main distribution frame, for performing various operations in response to the dialing of a preselected code number.

2. Description of the Prior Art

Telephone lines from various locations are connected to central office switching equipment at a main distribution frame. The majority of line interconnects performed at communications facilities are done on these frames. Each telephone line must be manually connected to the central office switching equipment at the main distribution frame. Cross-connections, changes, and rearrangements of the telephone lines are made by telephone technicians, commonly referred to as frame attendants.

Many main distribution frames are in remote locations. Frame attendants are dispatched from a central location to make wiring and equipment changes on the main distribution frames, usually at night.

One example of the type work performed on main distribution frames occurs when a telephone customer is delinquent in paying a telephone bill. A frame attendant will travel to the remote central office and make physical wiring changes in the switching apparatus and at the main distribution frame. These wiring changes deny incoming calls to the telephone, while allowing the customer to continue to make outgoing calls. If, after a certain time period, the customer has still not paid an outstanding bill, the frame attendant will once again be dispatched to the central office. This time, the frame attendant changes the wiring to deny both incoming and outgoing calls.

If the customer then pays the delinquent bill, and desires the restoration of telephone service, the frame attendant must be dispatched to the central office frame a third time. This time, the frame attendant manually restores telephone service to the customer by replacing the equipment wiring as it was originally.

Another example of work performed on main distribution frames occurs when a telephone receiver is in an "off-hook" condition for an extended time period. After a preselected time interval, a technician must remove the telephone line from the main distribution frame in order to release the central office telephone equipment to handle other customers. The technician must then let the customer know that the telephone line has been disconnected, or the customer will report having a telephone problem. The telephone receiver must then be hung up, and the telephone line reconnected to the central office equipment to restore complete service.

SUMMARY OF THE INVENTION

The remote control telephone service apparatus of the invention allows clerical personnel to perform certain operations without having skilled technicians travel to the site of the switching office main distribution frame. The apparatus is connected into a phone line between a customer's telephone and the central office switching equipment at the main distribution frame. The apparatus has a plurality of switches for presetting a selected code number.

A plurality of comparators are arranged to compare a dialed number received from a remote telephone location with the number pre-set in the apparatus connected into the telephone circuit at the main distribution frame. If the dialed number matches the pre-set code number, an output signal is provided for performing various operations relating to the telephone interconnect to the main distribution frame. If the dialed number does not match the code number, the output is inhibited and the various operations will not be completed.

The apparatus may also have a second set of rotary switches for presetting a second code number. A second set of comparators is arranged to compare a second dialed number to the second code number, after the first code has been matched. If this second code number is matched by the dialed number, a second output signal is provided for performing other selected operations, again relating to telephone service interconnection. Other usable output signals are derived by "ANDING" any combination one through six of the "matched" AND gates.

The apparatus, when connected as described, may be used for denying incoming calls to the selected telephone. If a first dialed number matches the first code number, the apparatus then denies outgoing calls to be placed from the selected telephone, as well. If the second dialed number matches the second code number, the telephone is restored to full service.

The apparatus also finds utility to disconnect the telephone from the main distribution frame, if the telephone receiver has been left in an "off-hook" condition for an extended time period. A recorder is provided to tell the customer the status of his service. If the receiver is returned to the hook, the apparatus will automatically restore the telephone line to full service.

The apparatus also provides recorded announcements for customers calling into telephone lines that are in trouble because of cut cables or other problems. The announcements give the calling customer information such as the status of the trouble and restoral times.

DESCRIPTION THE DRAWINGS

DESCRIPTION OF THE PREFERRED EMBODIMENT

Figure 1:
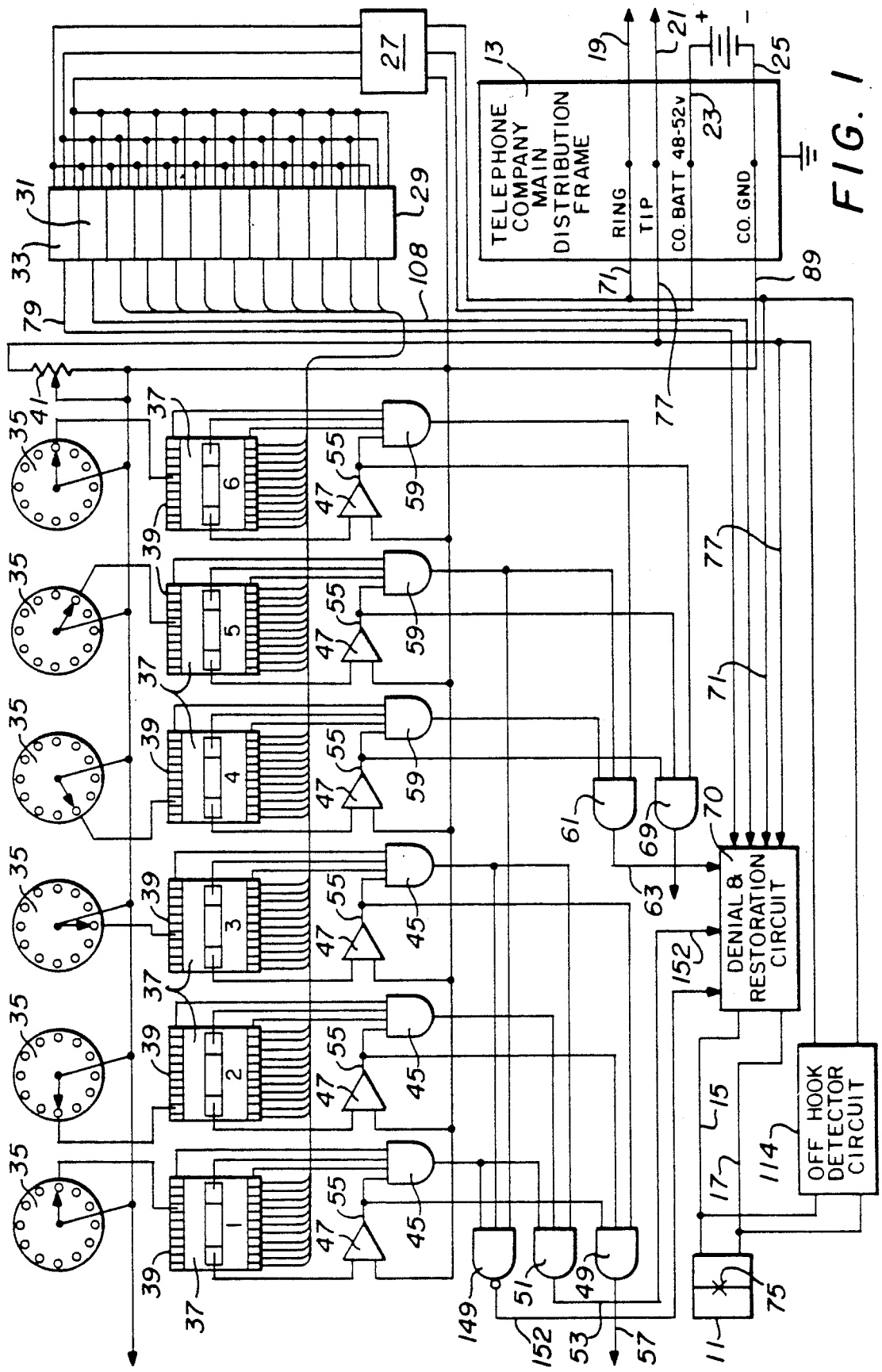
FIG. 1 is a schematic drawing of the telecommunications apparatus of the invention.

Referring to FIG. 1, the apparatus of the invention is connected between a customer's telephone 11 and a main distribution frame 13. The telephone line from the customer's telephone 11 has a battery or ring side 15 and a ground or tip side 17.

The ring side 15 of the customer's line is connected through line 71 from denial and restoration circuit 70 to the ring side 19 of the central office equipment at the main distribution frame 13. Likewise, the customer's tip side 17 is connected through line 77 from denial and restoration circuit 70 to the central office equipment tip side 21 at the main distribution frame 13. The main distribution frame 13 also has a central office battery connection on line 23 and a central office ground connection on line 25.

The ring side 19 is also connected to a tone or frequency receiver 27. Such receivers 27 are well known in the art. The receiver 27 receives tones corresponding to various digits coming from the customer's telephone 11 or incoming to the customer's telephone 11 from the main distribution frame 13.

The output of the frequency receiver 27 is fed into the inputs of a set of tone detectors 29. This set of detectors 29 includes a tone detector for each of the digits 0 through 9 in addition to a dial tone detector 31 and a ring tone detector 33. The tone detectors 29 detect and rectify incoming tones into either a logic high or a logic low. A logic high is generated corresponding to each digit received.

The preferred embodiment of the invention has six rotary wafer switches 35 and six comparators 37. Each rotary switch 35 has twelve positions, ten of which correspond to the digits 0 through 9. Each digit position of each of the rotary switches 35 is connected to a corresponding digit position in a set register 39, which is a component of the comparator 37. Each rotary switch 35 is manually set to a selected digit, 0 through 9. When a switch 35 is set to a particular digit, for example the digit 3, a signal from a voltage divider 41 is applied through the rotary switch 35 to the corresponding digit position in the corresponding set register 39. Any desired apparatus other than rotary switches can be used to store the correct data in each register 39. Each of the digits in the first set register 39 is then in a logic low state, except for the digit 3, which now has a logic high state.

Each comparator 37 also includes a digit dialed register 43. Each digit dialed register 43 has ten positions, corresponding to the digits 0 through 9. Each position is connected to the corresponding digit tone detector 29. When a particular digit is dialed, for example the digit 3, one of the tone detectors 29 sends an output signal to the position in the digit dialed register 43 corresponding to the digit 3. The comparator 37 then compares each of the positions in the set register 39 to the corresponding positions in the digit dialed register 43. If all of the positions in the set register 39 match the corresponding positions in the digit dialed register 43, the comparator 37 registers a match and provides a logic high signal to an AND gate 45. If the AND gate 45 receives high inputs from the comparator 37, from the set register 39, and from the digit dialed register 43, then the AND gate 45 produces a logic high output.

If the number which is dialed does not match the number which was set in register 39, then the comparator 37 will not find a match when it compares the positions in the set register 39 to the positions in the digit dialed register 43. The comparator 37 then registers a failure to match and provides a logic high input to an inhibit gate 47. The inhibit gate 47 sends a logic low signal to the AND gate 45 to prevent the AND gate 45 from producing a signal output. The inhibit gate 47 also sends a signal to a security alarm AND gate 49.

If the three digits dialed representing a first number match the three digits which were set on the first three rotary switches 35, all three of the associated AND gates 45 will have a logic high output. These three outputs are applied to a correct number detected AND gate 51 which will then generate a logic high signal on a line 53.

If none of the three digits of the first dialed number matches the corresponding digit in the first code number set in the rotary switches 35, all three of the inhibit gates 47 will produce a logic low output on lines 55, which are applied as inputs to the security alarm AND gate 49. When all three inputs at the security alarm AND gate 49 are logic low, the AND gate 49 produces an output voltage on line 57.

The second set of three comparators 37 are used to check a second dialed number. If the three digits of the second dialed number match the three digits set on the second set of three rotary switches 35, logic high inputs are applied on the three AND gates 59. Each of these AND gates 59 then produces a logic high output, which is applied to a second correct number detected AND gate 61. This produces a logic high output on a line 63 from the AND gate 61.

If any of the digits of the second dialed number do not match the corresponding digits in the second code number, as set on the rotary switches 35, an output is applied to an inhibit gate 65. A logic low output on a line 67 from the inhibit gate 65 is then produced and applied to the AND gate 59. The output on line 67 from the inhibit gate 65 prevents the AND gate 59 from producing a logic high output. If none of the digits of the second dialed number match any of the corresponding digits of the second stored code number, the outputs on each line 67 from the three inhibit gates 65 are applied to a security alarm AND gate 69.

Other control capabilities are derived by using the MATCH output of AND gates 45 and 59 for various combinations of the six comparators. FIG. 1 shows the use of the match gates 45 and 59 for comparators 1, 3 and 5 to present a logic high to NAND gate 149. The output of NAND gate 149 is a useful logic low on line 152 to Denial and Restoration circuit 70 as will be explained hereafter.

The signals on lines 53, 63 and 152 from the correct number dialed AND gates 51 and 61, and NAND gate 149 caused by the combinations of correct number dialed comparators 1, 3 and 5 are used to make changes in circuitry 70 that cause denial and restoration of telephone service. This circuitry 70 is located in the line between the customer's telephone 11 and the telephone switching equipment at the main distribution frame 13.

Figure 2:
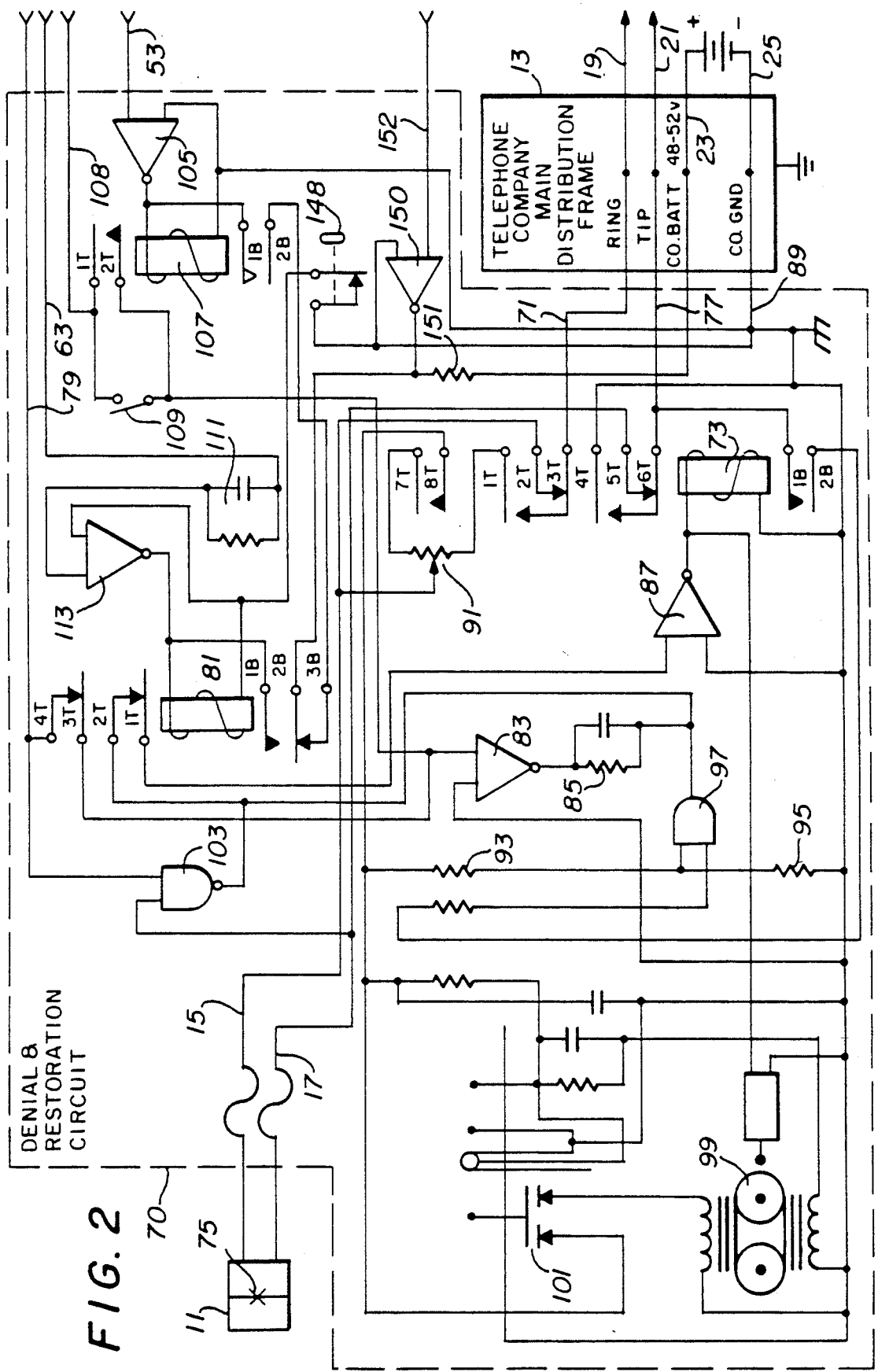
FIG. 2 is a schematic drawing of the circuitry for the denial and restoral functions of the apparatus of the invention.
Figure 3:
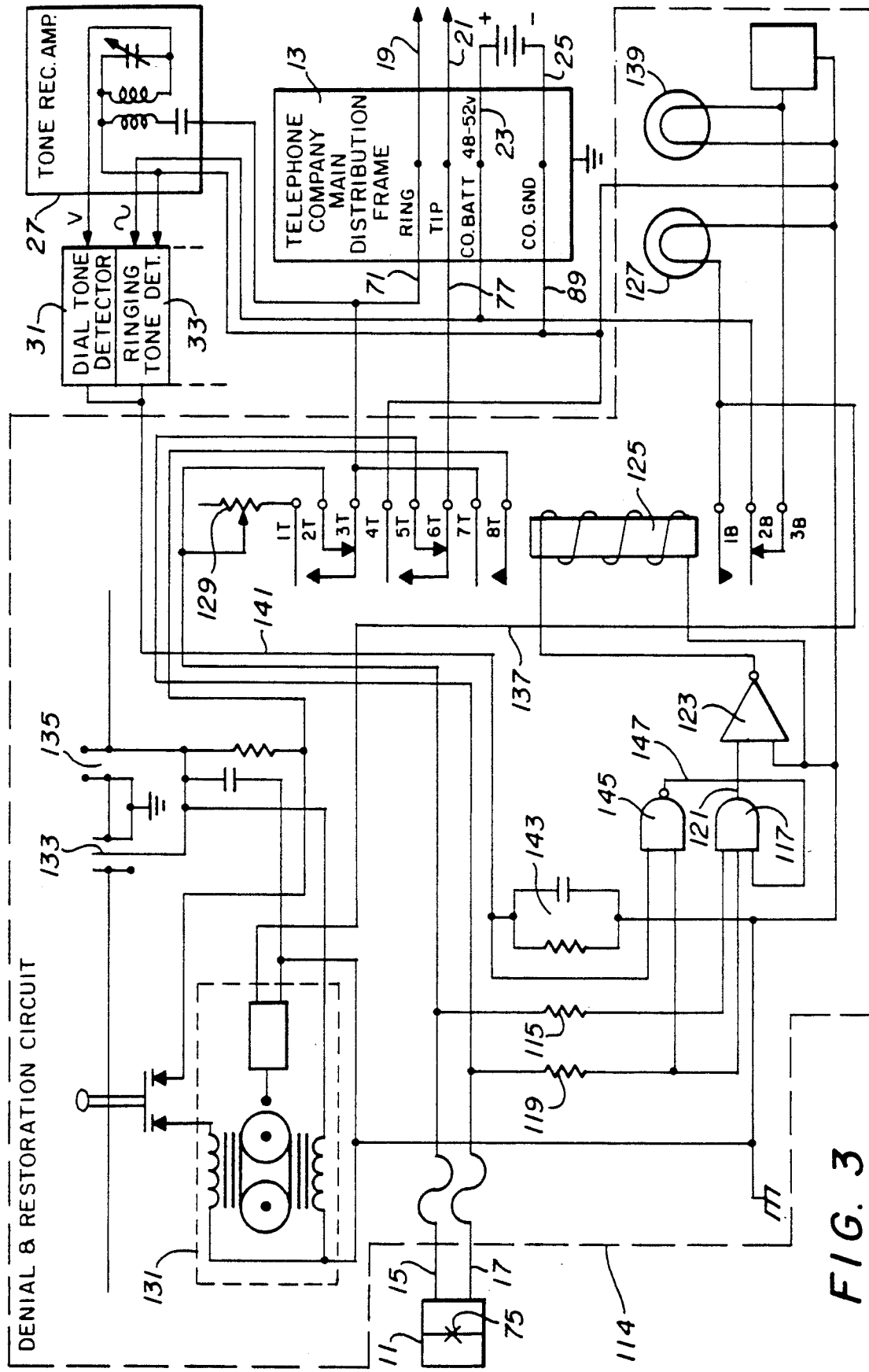
FIG. 3 is a schematic drawing of the circuitry for processing a telephone receiver "off-hook" condition by means of the apparatus of the invention.

FIG. 2 illustrates in detail the circuitry 70 for denial and restoration of telephone service to the customer's telephone 11. When the apparatus of the invention is initially installed, the circuitry 70 is set to deny incoming calls, but to allow outgoing calls from the telephone 11. The battery side on line 71 of the distribution frame 13 is connected to contacts of a relay 73. The circuit is traced from the battery side on line 71 through contacts 2T and 3T of the relay 73 to the customer's ring side on line 15. The circuit includes the customer's telephone 11, including the switch hook 75, and continues through the customer's tip side on line 17. The circuit again passes through the relay 73 at contacts 5T and 6T and returns to the company s tip side on line 77. The only elements in the circuit between the customer and the telephone company are the relay contacts and they have essentially zero resistance. Thus, there is no current drain on the lines in this condition. It is well-known in the art that the frequency of tone receiver 27 is capacitively coupled to the telephone lines (as shown in FIG. 3) and, thus, does not affect the integrity of the line since it has no current drain.

If an incoming call is placed to the customer's telephone 11, it is coupled through receiver 27 to the ring tone detector 33 (shown in FIG. 1). The ring tone detector 33 rectifies the ring tones and produces an output on line 79.

As shown in FIG. 2, the output on line 79 is applied through a relay 81 by means of contacts 4T and 3T to the input of a relay driver 83. The relay driver 83 amplifies the input and applies it across a long time constant R-C circuit 85. The long time constant R-C circuit 85 is designed to hold a positive voltage at the input of a relay driver 87 through normally closed contacts 2T and 1T of relay 81, which operates the relay 73.

A ring tone is normally applied to a customer's line for 2.6 seconds and is then off for 3.5 seconds. This cycle repeats until the customer answers, or some other event occurs to stop the ringing in the central office. The long time constant R-C circuit 85 holds the relay 73 from releasing during the silent interval of the ringing cycle between tones.

When the ring tone activator relay 73 the connection between contacts 5T and 6T of the relay 73 is opened and a connection between contacts 6T and 4T is established. This transfers the customer's tip side 17 from the central office tip side 77 to the central office frame ground 25. Operation of the relay 73 also transfers the customer's ring side 15 from contact 3T to contact 1T.

Operation of the relay 73 to transfer the ring side 15 from contact 3T to contact 1T opens the direct path from the central office to the customer and switches in a potentiometer 91. This adds overall resistance into the circuit from the central office to the customer'so the line equipment in the central office cannot operate to provide a connection to the central office switching equipment while the relay 73 is operated. The central office line equipment requires between fifteen and twenty-three milliamperes of current to operate under normal conditions. The Potentiometer 91 reduces the line current to a value below ten milliamperes when the relay 73 is operated as described.

The operation of relay 73 also causes a voltage from contact 7B to be applied to the input of an AND gate 97 through a voltage divider comprising resistors 93 and 95. The AND gate 97 serves as a holding network for the relay 73 such that if the customer lifts the receiver during the operational cycle of the relay 73 the relay will remain energized.

Current flowing from the ring side line 71 through contacts 3T and 1T of the relay 73, through the potentiometer 91, to ring side 15 is adjusted by means of the potentiometer 91 to trip stop the ringing coming from the central office, as if the customer had answered the telephone 11.

When the relay driver 87 generates an output to operate relay 73, the relay driver 87 also applies the battery power to the driver motor of a microrecorder 99. Applying power to the microrecorder 99 causes a prerecorded message to be applied through a recorder line switch 101 back to the ring side 15 of the line. The prerecorded message tells the caller why the call has not been completed.

When the caller hangs up and terminates the call, the central office equipment is released, and no further ringing tones are applied to the customer's ring side 15. After a brief holding period, the voltage developed across the long time constant R-C circuit 85 decays below the level required to hold the relay driver 87 operated. This releases the relay 73 and stops the microrecorder 99. The process repeats on every subsequent incoming call to the suspended telephone 11. However, the customer can use the telephone 11 to make outgoing calls, because his telephone 11 is connected to the central office line equipment through contacts 3T, 4T, 5T, and 6T of the relay 73.

Telephone systems are designed to permit the calling party to hear the audible ringing tones that indicate to the called party that a ringing signal is being applied to the line. When a customer under an incoming call suspension makes an outgoing call, there is a possibility that the ringing tones will have a volume sufficient to produce an output on line 79 from the ring tone detector 33. The apparatus of the invention prevents these ringing tones from cutting off outgoing calls.

To this end, the apparatus of the invention includes a NAND gate 103. When a customer lifts the handset for the telephone 11 to originate a call, battery power from the central office is applied to the customer's ring side 15 through the resistance of the telephone 11 to the tip side 17 thereby causing the tip to be high by some value, depending upon the distance of the customer from the central office. Incoming calls are restricted as previously explained while the customer's telephone 11 is on hook and the tip side 17 is low. As stated, when the customer lifts the receiver to originate a call, the tip goes high by some value. If, after a dialing sequence is completed, the audible ringing tones applied to the called customer's line have sufficient amplitude to generate an output from the ring tone detector 33, this output is applied to the input of the NAND gate 103. When this occurs, and the tip is high (the receiver is off the hook), both inputs of the NAND gate 103 are a logic high. A logic low is then produced at the output of the NAND gate 103. This logic low is applied to the output of the time delay circuit 85 and to the input of the relay driver 87 to prevent the voltage from building up sufficient to operate the cutoff relay 73.

The apparatus of the invention is configurable to deny outgoing calls as well as incoming calls by dialing a selected code number as explained earlier. Dialing the code number into the system causes a logic high output on line 53 from the correct number dialed AND gate 51 (shown in FIG. 1). This logic high on line 53 is applied to the input of a relay driver 105. The logic high at the input of the relay driver 105 is amplified and applied to operate a relay 107.

Operation of the relay 107 closes a holding circuit through contacts 1B and 2B of relay 107 and through contacts 3B and 2B of relay 81 to the central office battery by means of line 23. Also when the relay 107 operates, contacts 1T and 2T close to connect the logic high on line 108 from the dial tone detector 31 (shown in FIG. 1) to the input of relay driver 83. This logic high input is amplified and applied across the long time constant R-C circuit 85, through contacts 1T and 2T of the relay 81 to the relay driver 87, which operates relay 73. Relay 73 then operates every time a dial tone is detected on the customer's outgoing line. When the relay 73 operates, it cuts off the central office from the customer as previously described and the customer cannot originate a call.

The apparatus of the invention is also configurable to restore the customer's total telephone service by the dialing of the second code number. To restore total telephone service the customer's telephone number is dialed and the recorded announcement explaining that service has been denied because of nonpayment of the telephone bill is activated. This serves as a check to insure that the proper number is being restored to service. The second three digit code number is then input into the system and processed as explained earlier. A logic high is produced at the output of the second correct number detected AND gate 61. The output on line 63 from AND gate 61 is applied through a long time constant R-C circuit 111 and transferred to the input of a relay driver 113. The relay driver 113 amplifies the logic high to energize the relay 81 for about ten seconds as set by the R-C circuit 111. This time delay allows all relays of the apparatus to return to normal. To prevent subsequent ringing signals from again denying service to the customer after full service is restored by the above means, relay 81 is locked in its energized condition through its own 1 and 2 bottom contacts through a non-locking reset switch 148 to ground. Thus, contacts 3T and 4T are held open to prevent ringing signals from energizing relay 73.

The customer has paid the bill, the clerk in the telephone company business office has restored the line to full incoming and outgoing service. The Remote Control Telephone Service Apparatus is in a deactivated state having NO effect on customer'service. It has no current drain and does not affect the integrity of the telephone line. As long as relay 81 of FIG. 2 is held energized, no cut-off signals from driver 83 caused by the ringing tone or dial tone can pass through the now open contacts 1 and 2T of relay 81. The only connection to the ring and tip circuit is a pair of normally closed metallic contacts that have no effect on normal operation of the circuit (2T, 3T and 5T, 6T contacts of relay 73). The device will remain in the "full service" state until it is removed or reactivated.

Still referring to FIG. 2, there are two ways to reactivate the Remote Control Telephone Service Apparatus and cause it to restrict incoming and outgoing calls.

The first is a manual, non-locking, normally closed switch 148 that can be momentarily pressed in to open the holding path to ground for relay 81 to release it. The circuit path is from the ground side of relay 81 through the non-locking reset switch 148 to central office ground on line 25. Opening this path releases relay 81 and closes contacts 1T, 2T and 3T and also closes contacts 2T and 3T. This makes the device active again and it will perform the desired restrictions.

There is a need for reactivating the device remotely to prevent dispatching technicians to remote locations to turn the device on.

This is accomplished as follows: Refer to FIG. 1. The rotary switches 35 have been previously set with predetermined numbers as previously described. The first three switches are for the first command to deny outward service and the second three are to restore service. When these functions have been completed these numbers are still "set" in the rotary switches even though the digit dialed registers 43 were previously cleared out. As previously explained, any combination of the digits that "match" will provide an output to the AND gate for that particular comparator. The clerk dials the odd numbered rotary switch digits to reactivate the device. These are the digits "set" in the rotary switches coupled to comparators 1, 3 and 5 which would be digits 3, 6 and 4 as shown. These cause a HIGH output at AND gates 45 for comparators 1, 3 and 5. These HIGH outputs are coupled to NAND gate 149 in FIG. 1 which produces a LOW output if all three digits are correctly dialed. This LOW output is applied to the input side of relay driver 150 in FIG. 2 to cause an output to be applied to the top of resistor 151 to drop the voltage across relay 81 and release it and reactivate the Remote Control Telephone Service Apparatus. Register 151 is a dropping resistor in the relay holding path for relay 81. This makes the effect of the application of the LOW to the circuit more effective in unlatching relay 81.

The full cycle of denial of inward and outward service, restoration of service, deactivation of the Remote Control Telephone Service to assure no interruption of customer'service and reactivation of the device has been completed.

Because of the remote control features it is obvious that the device has application in other industries requiring turning circuits on and off. This permits remote operation of motors, pumps, lights, security door locks, etc.

Telephone service, including both outgoing and incoming calls, is now restored to the customer's telephone 11. An indication that full service has been restored will be given when the recorded announcement stops playing. The apparatus of the invention can then be removed from the telephone line on the next routine visit to the remote office or the apparatus can be left in place until it is needed for another nonpaying customer.

FIG. 3 illustrates the circuitry 114 for another use of the apparatus that comprises the invention. Circuitry 114 can be placed in parallel with denial and restoration circuit 70 because they do not operate at the same time. However, if desired, the two circuits could be combined in one circuit with one relay (73 in FIG. 2) having the necessary contacts. When the customer is one who leaves the receiver of the telephone 11 "off-hook" for extended periods of time, the apparatus of the invention can be inserted in the customer's line. Battery power from the central office ring side 19 on line 71 is applied through the customer's ring side 15 and through the "off-hook" telephone 11. This causes the customer's tip side 17 to become positive by some value, depending upon the resistance of the loop from the central office to the customer's telephone 11.

Battery power from the ring side 15 is applied to a resistor 115 to the first input of an AND gate 117. The voltage from the tip side 17 is applied across a resistor 119 and to a second input of the AND gate 117. The two resistors 115 and 119 are current limiting resistors to control the voltage developed at the first and second inputs of the AND gate 117.

When both the first and second inputs of the AND gate 117 go logic high, the output also goes to a logic high. This logic high output on line 121 is amplified by a relay driver 123 to operate a relay 125 and turn on a signal lamp 127.

Operation of the relay 125 causes the ring side of the customer's line to be transferred from contact 2T to 1T of the relay 125. This switches a potentiometer 129 into the ring side 15 of the circuit between the customer's line and the central office. The potentiometer 129 is set to permit the line current for this line to be at a value below that which will operate or hold in operation the central office equipment associated with that line. This releases the central office line seizure caused by the "off-hook" condition and it will remain released as long as the relay 125 is energized.

In addition, the voltage developed across the potentiometer 129 and applied to the ring side 15 of the line from the telephone service restoral circuitry 114 is adjusted to be sufficient to hold a positive potential across the resistors 115 and 119. This holds both inputs of the AND gate 117 at a logic high and will maintain an output from the relay driver 123, which holds the relay 125 energized as long as the customer has the receiver off hook.

In addition to the above connections, the central office tip line 77 is connected to contact 6T of the relay 125 and through contact 5T to the customer with the relay 125 in a deenergized condition. When the relay 125 is energized, as explained, a path is established from the central office tip line 77 to contact 6T to contact 4T to central office ground on line 25.

A recorder 131 is included in the circuitry to provide information and instructions to the customer when the customer tries to use the telephone 11. The recorder 131 is started by the operation of relay 125 when the central office battery is coupled to line 137 through contacts 1B and 2B of relay 125.

When the telephone 11 is returned to the "on-hook" condition, the switch hook contacts 75 open. This causes the second input of the AND gate 117 to go logic low and the output on line 121 from the AND gate 117 goes logic low. The input to the relay driver 123 goes to logic low, and the relay 125 is released. This restores the direct connection from the customer's telephone 11 to the central office through normally closed contacts 2T and 3T and through normally closed contacts 5T and 6T of the now released relay 125. This action also stops the recorder 131 because there is no longer any output on line 137 from the relay driver 123. A signal lamp 139 is now turned on to alert central office personnel that the circuit has been restored to normal use. The circuit for the signal lamp 139 is through contacts 2B and 3B of the relay 125. An audible alarm 140 can also be provided when the lamp 139 is turned on.

After the telephone 11 has been returned to the "on-hook" condition, and telephone service restored, it is likely that the customer will immediately want to make an outgoing call. It is of course important that the apparatus of the invention not remove the telephone 11 from service when the receiver is removed from the switch hook 75 for the placement of a call by the customer.

When the telephone has been returned to an "on-hook" condition, there is no voltage across the resistor 119 and the input to the AND gate 117 goes logic low. Central office battery power on the ring side 15 returns to the normal voltage level. A dial tone detector 31 and a ringing tone detector 33 are connected to the ring side 15 through the tone receiver and amplifier 27 and to ground through the central office frame 13. The tone receiver and amplifier 27 has a high input impedance and has little or no effect in the circuit while the apparatus of the invention is inserted in the line. When a call is to be placed, the presence of a dial tone is detected by the detector 31 and a logic HIGH is generated at the output of the dial tone detector. The same action occurs in the presence of ringing tone. On an incoming call ringing tones are detected by the ringing tone detector 33 and applied to line 141. This is permissible since dial tone and ringing tone are never present at any telephone line at the same time. These outputs on line 141 are applied across a long time constant R-C circuit 143 which holds the logic high for a predetermined interval of time, preferably from one to five minutes. The output on line 141 is also applied to the input of a NAND gate 145, which requires that both inputs be logic high to produce a logic low at the output. The second logic high to the gate 145 is the voltage developed across the resistor 119.

The logic low output on line 147 from the NAND gate 145 is applied to a third contact of the AND gate 117 and functions as an inhibitor of this gate. This prevents the reoperation of the relay 125 by removing the logic high output of the AND gate 117. This condition exists as long as there has been a dial tone or a ringing tone on the line within the time interval preset by the long time constant R-C circuit 143.

The apparatus of the invention has several advantages over the prior art. Changes in the circuitry between a telephone and a telephone central office main distribution frame are made from a remote location, even if it is in another city, by calling the telephone number and a preselected code number. The invention minimizes many costly trips to the telephone switching central office main distribution frame. The invention also allows a telephone to be taken out of service when the receiver is left "off-hook" for an extended time. Then, the phone may be automatically returned to full service when the customer replaces the receiver on the hook.

An additional advantage of the information over the prior art is the invention's ability to put pre-recorded messages on customers individual lines. The messages can inform customers that the lines are in trouble due to cut cables, inoperative PBX equipment, or other problems.

Only the preferred embodiments of the invention have been described. It should be understood that the invention is not limited to the embodiments disclosed, but is intended to embrace any alternatives, modifications, rearrangements, or substitutions of parts or elements as fall within the spirit and scope of the invention.

I claim:

1. Apparatus coupled to a telephone line between a subscriber's telephone and the main distribution frame of a central telephone office for controlling telephone service remotely from the telephone office by selectively connecting and disconnecting the subscriber's telephone to and from the ring and tip lines of the telephone line, said apparatus selectively configurable in a number of operating states and having an initial state for allowing outgoing calls and preventing incoming calls, comprising:

normally closed contact means in the ring and tip lines between the subscriber's telephone and the main distribution frame of the central telephone office that connect the telephone to the office when closed and disconnect the telephone from the office when open;

a tone/frequency receiver circuit coupled to the telephone line to detect tones transmitted over the telephone line and generate signals indicative of the detection of said tones; and circuit means coupled to the tone/frequency receiver circuit for generating a first control signal according to the operating state of the apparatus to selectively open the normally closed contact means to prevent outgoing calls upon the detection of a dial tone, said circuit means generating a second control signal according to the operating state of the apparatus to selectively open the normally closed contact means to prevent incoming calls upon the detection of a ring tone.

2. Apparatus as in claim 1 wherein said circuit means further comprises:
means for storing a first selected code number;
means for comparing a dialed number, dialed from a remote location and detected by said tone/frequency receiver circuit, to the first stored code number and generating an output signal when the dialed number matches the first code number; and
means responsive to the output signal and the first and second control signals for opening said contact means in the ring and tip lines to disconnect the subscriber telephone from the central office main distribution frame preventing the completion of incoming calls when the dialed number matches the stored first selected code number.

3. Apparatus as in claim 2 wherein said circuit means further comprises means for outputting and alarm signal on the telephone line if the dialed number does not match the code number.

4. Apparatus as in claim 2 wherein said circuit means further comprises:
means for storing a second selected code number;
means for comparing a second dialed number, dialed from a remote location and detected by the tone/frequency receiver circuit, to the second code number and generating a second output signal when the second dialed number matches the second code number; and
means responsive to the second output signal for closing said contact means in the ring and tip lines and restoring full service to the subscriber telephone when the second dialed number matches the second code number.

5. Apparatus for the remote control of telephone service having an initial state for enabling outgoing calls and inhibiting incoming calls, the apparatus connected at a telephone central office to a selected subscriber telephone line and the switching equipment at the distribution frame, comprising:
a tone/frequency receiver circuit coupled to the ring line producing substantially no current drain from the line to detect dialed number tones, ring tones and dial tones, and generating signals representing said tones;
means for storing a selected first code number;
means for comparing a remotely dialed number detected by said tone/frequency receiver circuit to the first code number and providing an output signal if the dialed number matches the first code number;
contact means in the telephone line between said distribution frame and said subscriber telephone;
means responsive to the output signal from said means for comparing to selectively open the contact means for denying outgoing and incoming calls to the telephone; and means for providing a recorded message to incoming callers.

6. Apparatus as in claim 5 further comprising means for preventing said dial tone and said ringing tone detected by said tone/frequency receiver circuit from opening the relay contacts so as to enable incoming and outgoing calls to be made.

7. Apparatus in claim 5 further comprising:
second means for storing a selected second code number;
second means for comparing a second remotely dialed number detected by said tone/frequency receiver circuit to the second code number after the first code number has been matched and for providing a second output signal if the second dialed number matches the code number; and
means responsive to the second output signal from said second means for comparing to close the relay contacts and restore the telephone to full service.

8. Apparatus as in claim 5 further comprising:
means for preventing ringing.tones from the switching equipment caused by an outgoing call from opening the relay contacts thereby permitting the outgoing call when the apparatus is configured in the initial state.

9. Apparatus for the remote control of telephone service having an initial state for enabling outgoing calls and preventing incoming calls, the apparatus connected at a selected subscriber telephone line and the telephone central office switching equipment at a main distribution frame, comprising:
a tone/frequency receiver circuit coupled to the ring line to detect dialed number tones, ring tones and dial tones, and generating signals representing said tones;
means for storing two selected code numbers;
first means for comparing a first dialed number detected by said tone/frequency circuit to the first code number;
first output means for providing a first output signal if the first dialed number matches the first code number;
means responsive to the first output signal for changing the operating state and opening contact means in the ring and tip lines to prevent outgoing telephone calls upon the detection of a dial tone and prevent incoming telephone calls upon the detection of a ring tone;
second means for comparing a second dialed number to the second code number;
second output means for providing a second output signal if the second dialed number detected by said tone/frequency receiver circuit matches the second code number; and
means responsive to the second output signal for changing the operating state and closing the contact means to enable incoming calls and outgoing calls.

10. Apparatus as in claim 9 further comprising means for coupling a recorded message to the telephone line for incoming or outgoing calls to notify the customer or the caller why the call has not been completed.

11. Apparatus as in claim 14 further comprising:
third means for comparing a third dialed number detected by said tone/frequency receiver circuit with a specific stored number in said first and second stored code numbers and generating a third output signal for a match of the third dialed number the specific stored code number; and
means responsive to the third output signal for changing the operating state to open said contact means in the ring and tip lines to prevent incoming calls to the selected subscriber telephone upon detection by said tone/frequency receiver circuit of the ring tone of an incoming call while allowing outgoing calls.

12. Apparatus coupled to a telephone line between a subscriber's telephone and the main distribution frame of a central telephone office for controlling telephone service remotely from the telephone office by selectively connecting and disconnecting the subscriber's telephone to and from the ring and tip lines of the telephone line, said apparatus selectively configurable in a number of operating states, comprising:

normally closed contact means in the ring and tip lines between the subscriber's telephone and the main distribution frame of the central telephone office that connect the telephone from the office when open;

a tone/frequency receiver circuit coupled to the telephone line to detect tones transmitted over the telephone line and generate signals indicative of the detection of said tones;

circuit means coupled to the tone/frequency receiver circuit for generating control signals according to a detected dial tone of an incoming call or ring tone of an outgoing call to selectively open the normally closed contact means thereby disconnecting the subscriber's telephone from the telephone line according to the selected operating state of the apparatus, the operating state of the apparatus selectively configured by the detection of the dial tone or the ring tone such that in a first, initial operating state the apparatus allows all outgoing calls from the subscriber but prevents all incoming calls to the subscriber, and in a second operating state the apparatus prevents both incoming and outgoing calls, and in a third operating state the apparatus enables both incoming and outgoing calls.

13. The apparatus as in claim 12 wherein said first circuit means further comprises:

means responsive to a signal indicative of a detected dial tone for generating a control signal to open said contact means and inhibit an outgoing call if said apparatus is configured in either the first or second operating states; and means responsive to a signal indicative of a detected ring tone from an incoming call for generating a control signal to open said contact means and inhibit an incoming call if said apparatus is configured in the second operating state.

14. The apparatus as in claim 12 wherein said circuit means further comprises:

means for storing a first selected tone code;
means for storing a second selected tone code;
means for storing a third selected tone code;
means for comparing a detected dial number tone transmitted from the central telephone office to the first selected tone code and generating a first match signal when the transmitted dial tone matches the first tone code;
means for comparing a detecting ring tone transmitted from the central telephone office to the second selected tone code and generating a second match signal when the transmitted ring tone matches the second tone code;
means for comparing a detected tone transmitted from the central telephone office to the third selected tone code and generating a third match signal when the transmitted tone matches the third tone code;
means responsive to the generated first match signal for configuring said apparatus in the second operating state;
means responsive to the generated second match signal for configuring said apparatus in the third operating state; and
means responsive to the generated third match signal for configuring said apparatus in the first, initial operating state.

15. The apparatus as in claim 14 wherein said circuit means further comprises means for generating an alarm signal coupled to the telephone line when the transmitted tone signal does not match either the first, second or third tone codes to notify the central telephone office of a dialed number tone transmission error.

* * * * *

UNITED STATES PATENT AND TRADEMARK OFFICE
CERTIFICATE OF CORRECTION

PATENT NO. : 5,065,424

DATED : November 12, 1991

INVENTOR(S) : Arthur O. Miller

It is certified that error appears in the above-identified patent and that said Letters Patent is hereby corrected as shown below:

On the Title page:
Under the heading "U.S. PATENT DOCUMENTS", change "9/1985" to
   --8/1985--;
Delete second occurrence of "4,686,696  8/1987  Lynch ... 379/29".
Column 4, line 68 (page 12, line 16), change "company s" to
   --company's--;
Column 5, line 41 (page 14, line 5), change "customer'so" to
   --customer so--;
Column 7, line 33 (page 19, line 7), change "customer'service" to
   --customer service--;
Column 8, line 20 (page 21, line 12), change "customer'service" to
   --customer service--;
Column 10, line 34 (page 27, line 12), change "customers" to
   --customers'--;
Column 12, line 22 (amendment dtd 5/10/91, page 4, line 4), change
   "at" to --to--.

Signed and Sealed this

Twenty-seventh Day of April, 1993

*Attest:*

MICHAEL K. KIRK

*Attesting Officer*      *Acting Commissioner of Patents and Trademarks*